United States Patent
Tenera Morgado et al.

(10) Patent No.: US 12,078,585 B2
(45) Date of Patent: Sep. 3, 2024

(54) HYPERSPECTRAL QUANTITATIVE IMAGING CYTOMETRY SYSTEM

(71) Applicant: CYTOGNOS, S.L., Salamanca (ES)

(72) Inventors: José Mário Tenera Morgado, Outeiro de Gatos-Meda (PT); Álvaro Rodríguez De La Gala, Palencia (ES)

(73) Assignee: CYTOGNOS, S.L., Salamanca (ES)

( * ) Notice: Subject to any disclaimer, the term of this patent is extended or adjusted under 35 U.S.C. 154(b) by 259 days.

(21) Appl. No.: 17/615,539

(22) PCT Filed: May 29, 2020

(86) PCT No.: PCT/EP2020/064984
§ 371 (c)(1),
(2) Date: Nov. 30, 2021

(87) PCT Pub. No.: WO2020/239981
PCT Pub. Date: Dec. 3, 2020

(65) Prior Publication Data
US 2022/0228968 A1    Jul. 21, 2022

(30) Foreign Application Priority Data

May 31, 2019  (EP) .................................... 19382444

(51) Int. Cl.
*G01N 15/1433*    (2024.01)
*G01J 3/12*    (2006.01)
(Continued)

(52) U.S. Cl.
CPC ............ *G01N 15/1433* (2024.01); *G01J 3/32* (2013.01); *G01N 15/1429* (2013.01);
(Continued)

(58) Field of Classification Search
CPC ........... G01J 2003/102; G01J 2003/123; G01J 2003/1234; G01J 2003/1243;
(Continued)

(56) References Cited

U.S. PATENT DOCUMENTS 9,797,836 B1 * 10/2017 Sinclair ................ G01N 15/147
2003/0096302 A1    5/2003 Yguerabide et al.
(Continued)

FOREIGN PATENT DOCUMENTS

CN        104507382 A      4/2015
CN        104516085 A      4/2015
(Continued)

OTHER PUBLICATIONS

Constantinou et al., "Extending immunofluorescence detection limits in whole paraffin-embedded formalin fixed tissued using hyperspectral confocal fluorescence imaging", Journal of Microscopy, 234(2): 137-146 (2009).
(Continued)

*Primary Examiner* — Hina F Ayub
(74) *Attorney, Agent, or Firm* — Knobbe, Martens, Olson & Bear, LLP

(57)    ABSTRACT

A hyperspectral detection system of luminescence from solid phase samples that are stimulated with radiation sources. includes an observation region, a sample holder configured to hold one or more solid-phase samples, at least one radiation source configured to irradiate the observation region, and a collector configured to collect the radiation emitted through or reflected by the sample upon irradiation by the at least one radiation source. The collector has a magnification factor value (M) equal to or lower than 20, and has a numerical aperture value equal to or higher than 0.25. A multichannel filter is configured to selectively filter the wavelength of the radiation collected by the collector,
(Continued)

and an image sensor is configured to receive the filtered radiation and generate an image that is a two-dimensional map of the sample.

23 Claims, 7 Drawing Sheets

(51) Int. Cl.
*G01J 3/28* (2006.01)
*G01J 3/32* (2006.01)
*G01N 15/10* (2024.01)
*G01N 15/1429* (2024.01)
*G01N 15/1434* (2024.01)

(52) U.S. Cl.
CPC ............... *G01J 2003/1243* (2013.01); *G01J 2003/2826* (2013.01); *G01N 2015/1006* (2013.01); *G01N 2015/144* (2013.01)

(58) Field of Classification Search
CPC .... G01J 2003/2826; G01J 3/26; G01J 3/2823; G01J 3/32; G01N 15/1429; G01N 15/1433; G01N 2015/1006; G01N 2015/144
See application file for complete search history.

(56) References Cited

U.S. PATENT DOCUMENTS

| | | | |
|---|---|---|---|
| 2007/0019198 A1* | 1/2007 | Tuschel | G01J 3/02 356/432 |
| 2007/0053573 A1 | 3/2007 | Rabinovich | |
| 2011/0285995 A1* | 11/2011 | Tkaczyk | G01J 3/02 356/326 |
| 2012/0242859 A1 | 9/2012 | Sasaki | |
| 2014/0183362 A1* | 7/2014 | Islam | A61B 5/0022 250/338.4 |
| 2014/0312212 A1* | 10/2014 | Schappacher | G01J 3/0224 250/225 |
| 2015/0092099 A1 | 4/2015 | Shen et al. | |
| 2016/0091705 A1* | 3/2016 | Ben Ezra | G02B 21/361 348/79 |
| 2018/0017444 A1 | 1/2018 | Pini et al. | |
| 2018/0031480 A1 | 2/2018 | Sinclair | |
| 2018/0067053 A1* | 3/2018 | Aizawa | G02B 21/0036 |
| 2018/0140198 A1 | 5/2018 | Islam | |
| 2018/0180476 A1 | 6/2018 | Richarte et al. | |
| 2018/0184015 A1* | 6/2018 | Richarte | G01J 3/2823 |
| 2021/0191096 A1* | 6/2021 | Watanabe | G02B 21/0032 |

FOREIGN PATENT DOCUMENTS

| | | | |
|---|---|---|---|
| CN | 106796143 | A | 5/2017 |
| JP | 2001-099710 | A | 4/2001 |
| JP | 2006-526783 | A | 11/2006 |
| JP | 2009-244270 | A | 10/2009 |
| JP | 2009-537021 | A | 10/2009 |
| JP | 2011-127933 | A | 6/2011 |
| JP | 2012-508366 | A | 4/2012 |
| JP | 2017-064405 | A | 4/2017 |
| JP | 2017-146598 | A | 8/2017 |
| JP | 2019-504325 | A | 2/2019 |
| WO | WO 2018/125941 | A1 | 7/2018 |

OTHER PUBLICATIONS

International Search Report issued in International Application No. PCT/EP2020/064984, mailed on Jul. 29, 2020.
Klein et al., "Quantitative Hyperspectral Reflectance Imaging", Sensors, 8(9): 5576-5618 (2008).
Li et al., "Review of spectral imaging technology in biomedical engineering: achievements and challenges", Journal of Biomedical Optics, SPIE, 18(10): 100901 (2013).
Lu et al., "Medical hyperspectral imaging: a review", Journal of Biomedical Optics, SPIE, 19(1): 10901 (2014).
Notice of Reasons for Refusal issued in Japanese Application No. 2021-571457, dated Mar. 5, 2024.
Office Action issued in Chinese Application No. 202080040450.7, dated Mar. 18, 2024.
Search Report issued in Japanese Application No. 2021-571457, dated Nov. 22, 2023.
Search Report issued in Chinese Application No. 202080040450.7, dated Mar. 18, 2024.
Office Action issued in EP Application No. 20728073.6, dated Jun. 28, 2023.
Office Action issued in JP Application No. 2021-571457, dated Nov. 24, 2023.
Notice of Reasons for Refusal issued in Japanese Application No. 2021-571457, dated Jun. 19, 2024.

\* cited by examiner

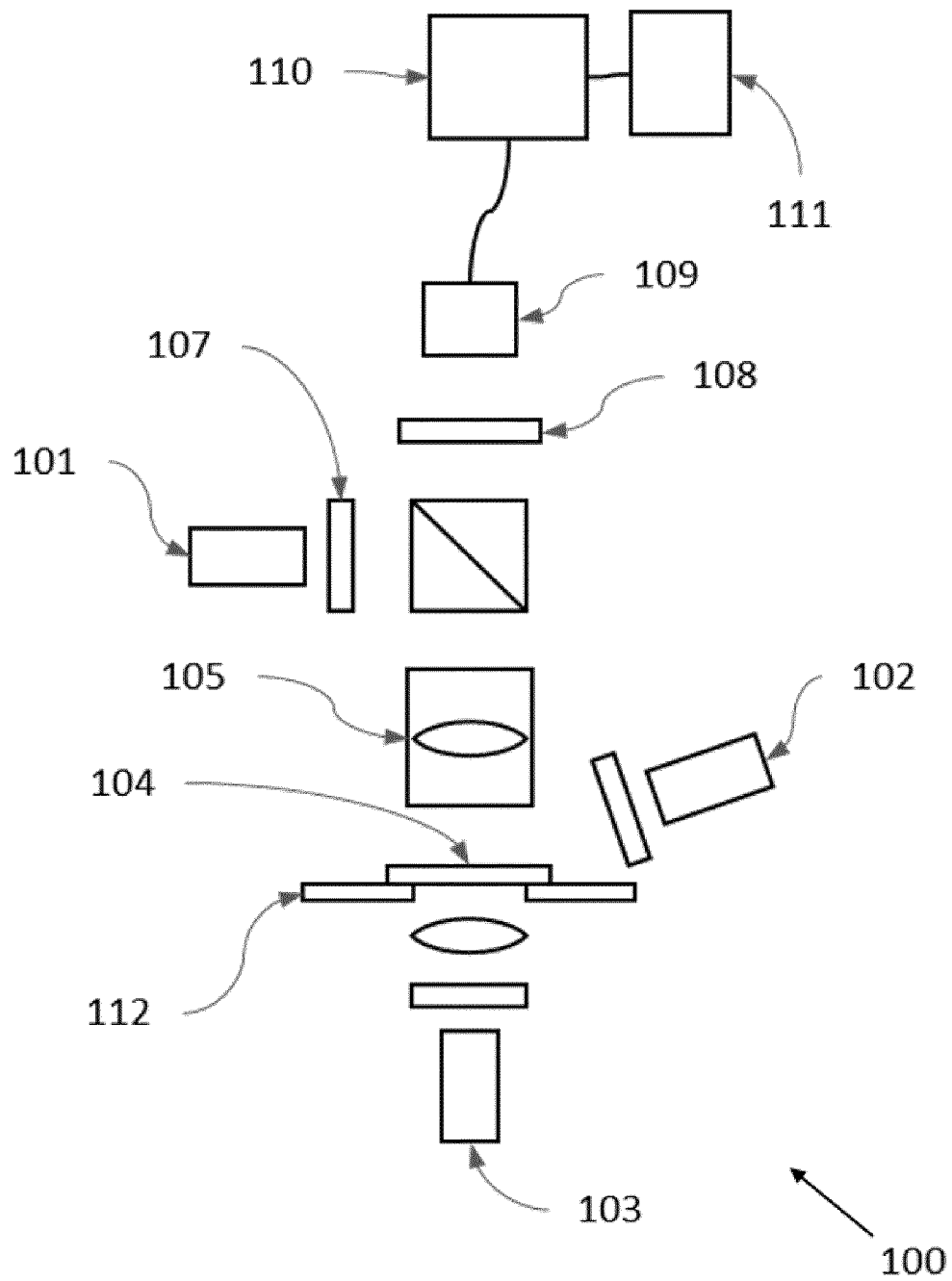
FIG. 1-A

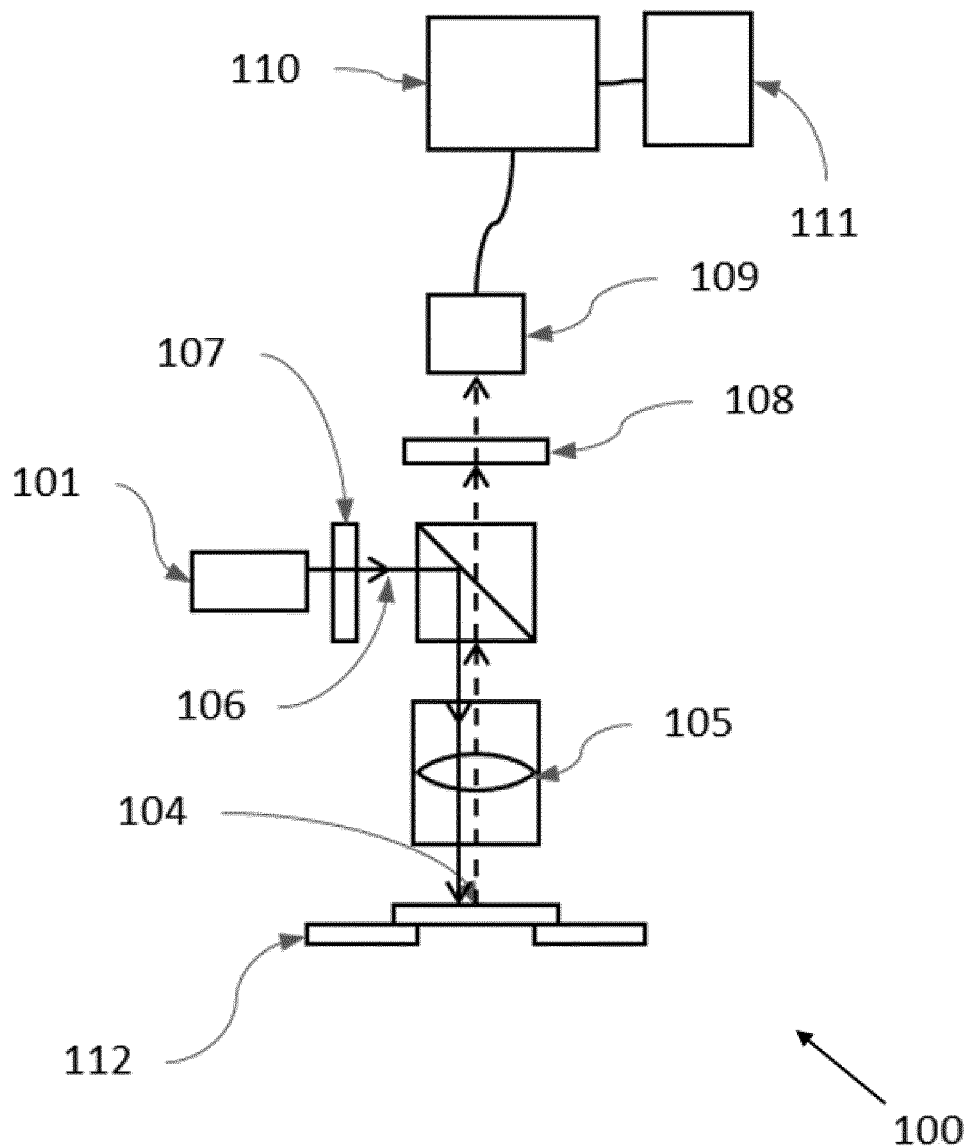
FIG. 1-B

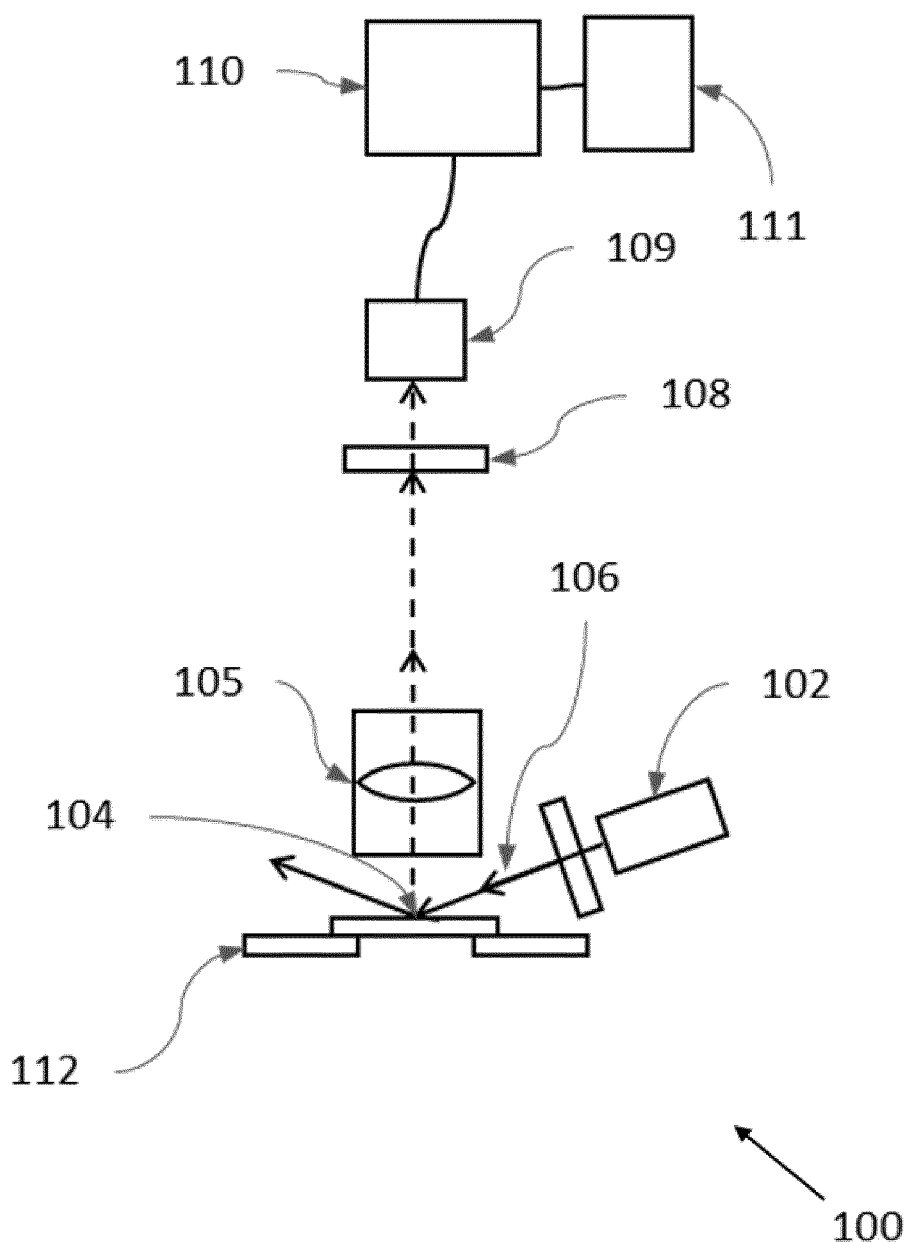
FIG. 1-C

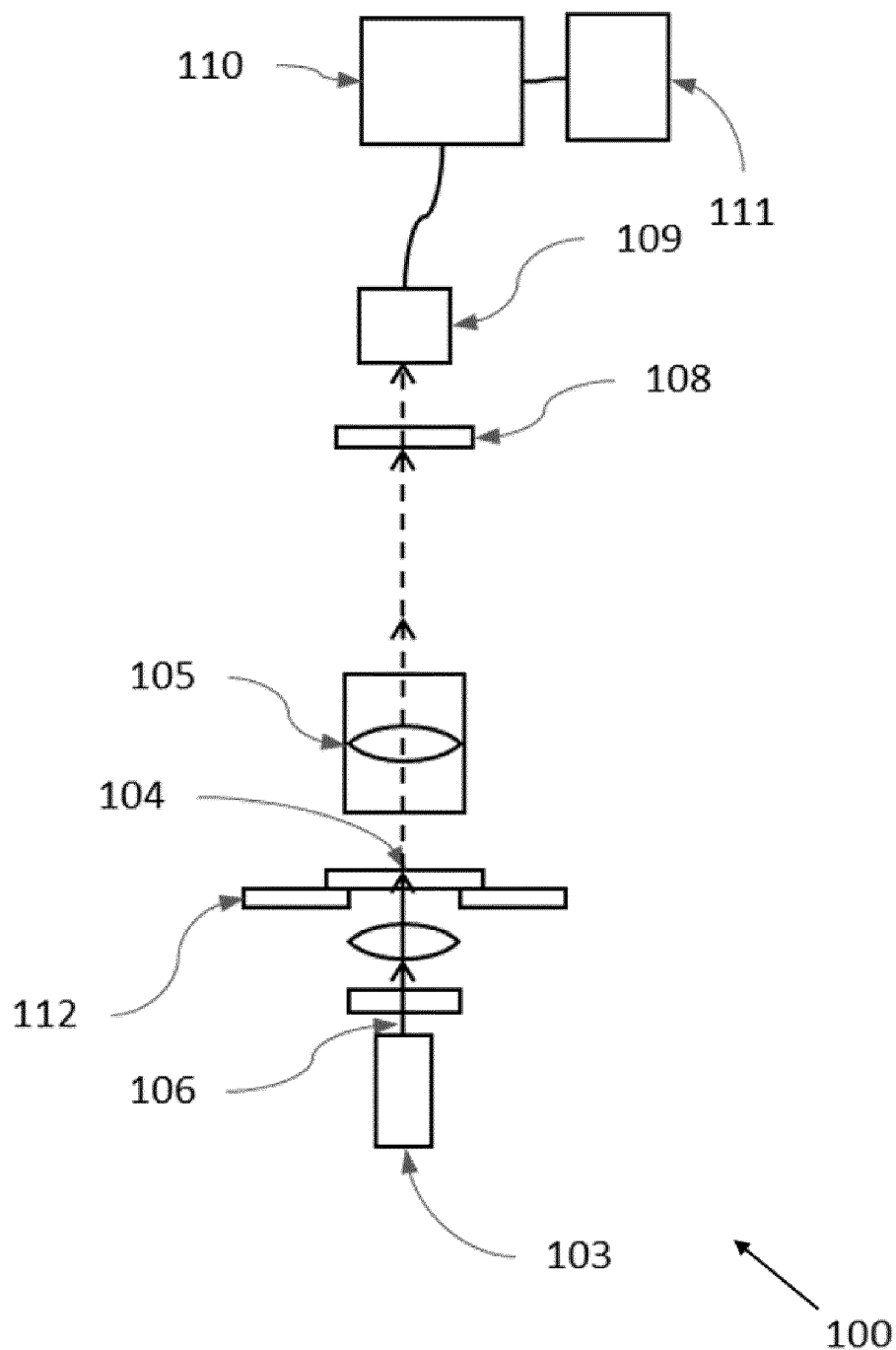
FIG. 1-D

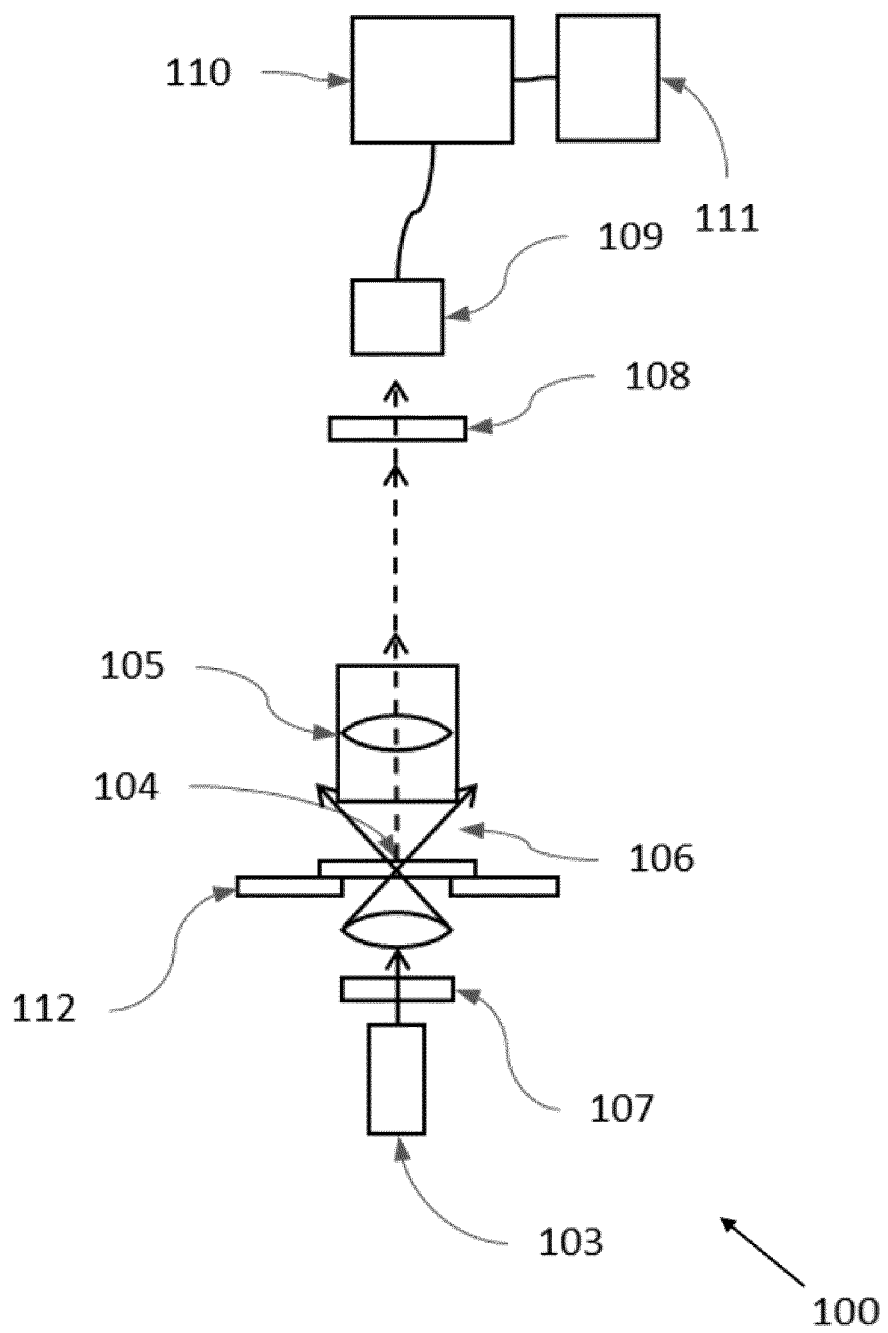
FIG. 1-E

HYPERSPECTRAL QUANTITATIVE IMAGING CYTOMETRY SYSTEM

TECHNICAL FIELD OF THE INVENTION

The present invention relates to hyperspectral detection of luminescence and, in particular, to the detection of luminescence from solid phase samples which are stimulated with radiation sources.

BACKGROUND OF THE INVENTION

The function of a biological tissue is the result of the coordinated action of its cellular components. Each of those cells present a specific phenotype resulting from its interaction with the histological environment and any deregulation of these mechanisms may result in diseases like cancer. Therefore, being able to analyze single-cell characteristics within a spatial context is essential to understand how tissues work under normal and disease situations and to help the development of effective treatments.

The result of a disease affecting a specific tissue may not always be noticeable by classical histological and morphological evaluation. Some structures and components of the tissues may appear morphologically similar but present important differences in terms of their molecular constituents as a result of the disease associated deregulation. In such a case, multiple and more specific staining, like those provided by immunological methods, need to be employed to identify those differences. An example of such is the identification of immune cells within a tissue under study. Their presence may result from a disease condition affecting the tissue and inducing the recruitment of those cells to the lesioned zone or, on the other hand, their presence may be the primary cause of the disease affecting the tissue.

In both cases a correct identification of the lineage and functional status of those cells is mandatory and, particularly in the case of small lymphocytes, even the morphological evaluation from an expert is not enough to unravel the nature, origin and heterogeneity of those cells. Only a multiparametric immunophenotyping approach allows for the correct characterization and heterogeneity evaluation of the cell infiltrates. And, as important as being able to obtain multiparametric information of the tissue constituents, is the association of the different phenotypically identified characteristics with the possible anatomical changes observed in the tissue. Those changes may be identified by the direct observation of an expert in the field.

The multiparametric analysis of single cells using flow cytometry has proven fundamental to unravel the heterogeneity of cellular phenotypes under normal and disease situations when applied to cell suspensions. Modern flow cytometers can analyze dozens of simultaneous parameters and the development of multispectral systems and the onset of mass cytometry promise to push those numbers up in the near future. However, these technologies cannot work with tissue specimens without disturbing their native architecture and are not capable of studying constituents of the extracellular environment of the tissue. On the other hand, despite being the standard choice for cellular morphology visualization and spatial localization, microscopy instruments fail to allow a quantitative and objective analysis of cellular components on statistically significant number of cells and lack the standardization capabilities existent in other methodologies like flow cytometry.

Others have attempted to solve some of these issues by adapting the configuration of a flow cytometer to scan samples immobilized on a microscope slide using lasers to excite fluorescent molecules on the sample and to build a representation of the molecules present on the tissue pixel by pixel (Laser Scanning Cytometry). This idea was later adapted to use mass spectroscopy instead of fluorescence detection to increase the number of simultaneous molecules to be analyzed (Imaging Mass Cytometry). Nevertheless, both approaches are considerably slow due to the need for studying the biological tissue one pixel at a time.

Accordingly, there is a need for a system that provides quantitative data on the size and expression of markers from cells and/or tissues immobilized in a solid phase sample support.

The most common approach currently available is to perform multiple single-parametric studies using conventional microscopy. This approach maintains the architectural structure of the samples (usually biological solid tissues) but is not quantitative and lacks the multiparametric dimension needed for complex studies.

Alternatively, multiparametric flow cytometry may be employed to obtain multiparametric information on the biological tissues but at the cost of losing spatial information due to the tissue disaggregation needed to obtain single cell suspensions.

Laser Scanning Cytometry (LSC) has been developed by adapting the configuration of a flow cytometer to scan samples immobilized on a microscope slide. It uses lasers to excite fluorescent molecules on the sample and to build a representation of the molecules present on the tissue pixel by pixel. For this reason, and despite being a snap-shot system, where all the "colors" are sampled simultaneously, it is a very slow methodology. Moreover, this technology remained limited to a very limited potential in terms of multiplexing, only allowing the study of 3-4 simultaneous parameters.

In a similar way, others have adapted mass cytometry to perform studies on solid tissues (Imaging Mass Cytometry-IMC). Unlike LSC, IMC uses metal-conjugates instead of fluorescent or chromogenic conjugates to reveal tissue components and, yet, have a high multiplex potential. Nevertheless, since, like in LSC, the sample is "imaged" in a single pixel basis, it suffers from the same drawbacks being a very slow technology.

Alternatively, multispectral and hyperspectral capabilities have been applied to microscopy-based systems in order to increase the number of simultaneous markers that can be analyzed. Using two-dimensional sensors for sampling data, these systems can sample multiple spatial locations simultaneously; nevertheless, these systems are meant to provide visual information instead of reproducible and quantifiable data and are designed to provide mostly high-resolution information on small amounts of a biological material than to analyze large areas of tissues.

SUMMARY OF THE INVENTION

The present invention provides a solution for the aforementioned problems, by a hyperspectral quantitative imaging cytometry system according to claim 1 and a method according to claim 15. In dependent claims, preferred embodiments of the invention are defined.

The present invention provides a system and a method to obtain quantitative data on the size and expression of markers from cells and tissues of biological samples immobilized on a solid phase sample support, in a rapid way, by focusing on the overall tissue structure with cellular resolution, rather than on the subcellular level of resolution.

In a first inventive aspect, the invention provides a hyperspectral quantitative imaging cytometry system comprising:
- an observation region, comprising a sample holder configured to hold one or more solid-phase samples,
- at least one radiation source configured to irradiate the observation region,
- a collection element configured to collect the radiation emitted through or reflected by the sample upon irradiation by the at least one radiation source,
- a multichannel filtration element configured to selectively filter the wavelength of the radiation collected by the collection element, and
- an image sensor configured to receive the filtered radiation and to generate an image that is a two-dimensional map of the sample, the image sensor comprising a two-dimensional array of radiation detecting elements.

The solid-phase samples are generally provided on solid phase sample supports. In an embodiment the sample holder is configured to retain at least one solid phase sample support, each support adapted to contain an immobilized sample, preferably a biological sample. The supports may be of different materials, preferably crystalline and transparent to light (e.g. glass or plastic), and of different shapes and sizes, preferably with rectangular shape (e.g. a microscope slide).

The term "component" will be used to mean any molecule naturally present in a cell or tissue. The terms "tag" and "molecular tag" will be used to mean any substance added to the sample in order to reveal the presence of specific components naturally present in the sample. The term "marker" will be used to define any component on the sample that emits radiation either naturally or due to the presence of molecular tags added to the sample; a marker is used to define the nature of a cell or tissue. The term "spectral signature" is used to mean the unique emission spectrum of a structure or a pixel and resulting from the unique combination of markers present in that structure or pixel. The term "list mode file" is used to mean a data file structure where the information on different elements of interest, like biological structures, are stored and each of those elements is represented by a row on a multi-row list.

The at least one radiation source is arranged to irradiate the observation region. Thus, when a sample is present in the observation region, the radiation interacts with the components of the sample and, if present, with the molecular tags used in combination with the sample. From this interaction, radiation may be emitted by the sample as a result of any process such as scattering, fluorescence, phosphorescence, chemiluminescence or selective absorption/transmittance. The radiation emitted from the sample is collected using the collection element, passes through the multichannel filtration element and reaches the image sensor. The multichannel filtration element should be understood as a filter whose spectral properties vary along the filter, thus providing position-dependent filtration of incoming radiation.

The image sensor comprises a two-dimensional array of radiation detecting elements. The radiation detecting elements receive radiation and provide an output related to the radiation received at each radiation detecting element. As a result, an image is generated that is a two-dimensional map of the sample. In an embodiment the image sensor is a charge-coupled device (CCD), a complementary metal oxide semiconductor (CMOS) or an electron multiplier charge-coupled device (EMCCD).

Preferably, the multichannel filtration element is arranged between the collection element and the image sensor, spaced from them. In a specific embodiment, the system further comprises at least one lens configured to project the image captured or collected by the collection element on a plane; the multichannel filtration element is positioned at such plane where the image is projected such that the image is projected on the filtration element; and the system comprises at least one additional lens configured to capture said intermediate image filtered by the multichannel filtration element and to project it to the image sensor. In other words, the filtration element is placed on the exact plane (or slightly offset from it) where the first lens projects an intermediate image formed between the collection element and the image sensor. Therefore, two lenses or, similarly, two sets of lenses may be used to form and collect this intermediate image.

In an embodiment the at least one radiation source is configured to emit radiation with a wavelength within the ultraviolet (UV), visible (VIS) or near infrared (NIR) range, preferably within the range from 200 nm to 1200 nm, more preferably within the range from 350 nm to 950 nm. The system may include one or several radiation sources. In an embodiment the system includes a plurality of radiation sources, each radiation source being configured to emit radiation in a different wavelength interval, for example the wavelengths comprised in the range from 525 nm to 625 nm.

In an embodiment the filtration element is arranged to be movable between at least two positions, wherein each position of the filtration element selectively filters the wavelength of the radiation that reaches each radiation detecting element of the image sensor. In a preferred embodiment the filtration element is arranged to be movable to a plurality of positions. Preferably, the movement of the filtration element is parallel to one of the spatial dimensions of the field of view (FOV) of the collection element.

In an embodiment the filtration element is a continuous or a semi-continuous linear variable filter. Preferably, the filtration element is configured to filter radiation wavelengths between 200 nm and 1200 nm, more preferably between 350 nm and 950 nm.

In an embodiment the observation region is interposed between at least one radiation source and the collection element, such that the radiation of said radiation source passes through the observation region before being collected by the collection element, i.e. according to a trans-illumination configuration.

In an embodiment at least one radiation source is arranged on the same side of the observation region as the collection element, such that the observation region reflects the radiation of the radiation source before being collected by the collection element, i.e. according to an epi-illumination configuration.

In an embodiment at least one radiation source and the collection element are arranged so the beams of radiation from the radiation source are directed at a non-zero angle with respect to the optical axis of the collection element, i.e. according to a dark field configuration.

In an embodiment at least one radiation source and the collection element (105) are arranged so the beams of radiation from the radiation source are directed along the optical axis of the collection element, i.e. according to a bright field configuration.

In a preferred embodiment, the system comprises a plurality of radiation sources, each radiation source providing radiation of a given wavelength ($\Lambda$) and being arranged according to a different irradiation mode ($\alpha$) selected from: bright field epi-illumination, dark field epi-illumination, bright field trans-illumination and dark field trans-illumination.

In an embodiment the system comprises a processor. In a particular embodiment, the processor is part of a computer, for example a personal computer.

In an embodiment the processor is configured to perform the following steps:
- receiving a plurality of wavelength-coded two-dimensional maps of the sample, the plurality of wavelength-coded two-dimensional maps being associated to a plurality of positions of the filtration element, wherein a wavelength-coded two-dimensional map is an image generated by the image sensor based on the radiation it receives for a position of the filtration element;
- generating a plurality of monochromatic two-dimensional maps of the sample by combining parts of the wavelength-coded two-dimensional maps of the sample which correspond to a specific wavelength;
- building a spectral cube comprising the plurality of monochromatic two-dimensional maps;
- identifying sample structures on the spectral cube and obtain their spectral signature;
- comparing the spectral signatures obtained with a database of spectral signatures of known structures, and/or decomposing the spectral signatures and obtaining an estimation of the abundance of each marker in each of the identified sample structures, a marker being any component on the sample that emits radiation either naturally or due to the presence of molecular tags added to the sample so that a marker is used to define the nature of a cell or tissue.

In an alternative embodiment wherein the system comprises a processor, the processor is configured to:
- receive a plurality of wavelength-coded two-dimensional maps of the sample, the plurality of wavelength-coded two-dimensional maps being associated to a plurality of positions of the filtration element, wherein a wavelength-coded two-dimensional map is an image generated by the image sensor based on the radiation it receives for a position of the filtration element;
- generate a plurality of monochromatic two-dimensional maps of the sample which correspond to a specific wavelength ($\lambda$) by estimating, for each pixel of a monochromatic two-dimensional map, the measured signal at such specific wavelength ($\lambda$) from all the wavelength-coded two-dimensional maps by a multivariate interpolation process;
- build a spectral cube comprising the plurality of monochromatic two-dimensional maps;
- identify sample structures on the spectral cube and obtain their spectral signature;
- compare the obtained spectral signatures with a database of spectral signatures of known structures and/or decompose the spectral signatures and obtain an estimation of the abundance of each marker in each of the identified sample structures, a marker being any component on the sample that emits radiation either naturally or due to the presence of molecular tags added to the sample so that a marker is used to define the nature of a cell or tissue.

In an embodiment, the processor is configured to obtain the size and/or shape of the sample structures.

In an embodiment the processor is configured to perform any of the previous steps for a plurality of irradiation wavelengths ($\Lambda$) and/or for a plurality of irradiation modes ($\alpha$), wherein each monochromatic two-dimensional map corresponds to radiation emitted at a specific wavelength ($\lambda$) when the sample is irradiated with a given irradiation wavelength ($\Lambda$) and in a given irradiation mode ($\alpha$), and wherein the step of building a spectral cube is performed by combining the plurality of monochromatic two-dimensional maps.

In an embodiment the processor is configured to control the sequential recording of the plurality of wavelength-coded two-dimensional maps of the sample coordinated with the sequential displacement of the filtration element. In another embodiment the system comprises a second processor configured to control the sequential recording of the plurality of wavelength-coded two-dimensional maps of the sample coordinated with the sequential displacement of the filtration element. Preferably, the filtration element is a continuous or a semi-continuous linear variable filter, more preferably a continuous linear variable filter.

In an embodiment the system comprises a memory for data storage. In a particular embodiment, the memory for data storage is a non-volatile computer memory, such as a hard disk drive, an EEPROM memory, or an optical disk.

In an embodiment at least one radiation source is a laser, a light emitting diode or a lamp. The radiation sources may be configured to provide monochromatic or broadband radiation.

In an embodiment the system comprises a band-pass filter interposed between at least one radiation source and the observation region. Advantageously, the band-pass filter allows selecting specific radiation wavelengths emitted by a broadband radiation source.

In an embodiment the collection element comprises a lens, or a combination of lenses, configured to capture radiation from multiple spatial locations of the observation region simultaneously.

In an embodiment the collection element has a magnification factor value lower than 20, preferably lower than 10, more preferably lower than 2.

In an embodiment the collection element has a numerical aperture value higher than 0.25, preferably equal to or higher than 0.5.

In a second inventive aspect the invention provides a method for obtaining data from a solid-phase sample using a hyperspectral quantitative imaging cytometry system according to any of the embodiments of the first inventive aspect, the method comprising the following steps:
a) providing a sample;
b) irradiating the sample with radiation that interacts with the sample, such that the sample emits radiation;
c) capturing the emitted radiation with the collection element;
d) filtering the emitted radiation using the multichannel filtration element;
e) sequentially recording a plurality of wavelength-coded two-dimensional maps of the sample coordinating with the sequential displacement of the filtration element, wherein each position of the filtration element selectively filters the wavelength of the radiation that reaches each radiation detecting element of the image sensor and wherein a wavelength-coded two-dimensional map is generated by the image sensor based on the radiation it receives for each position of the filtration element;
f) generating a plurality of monochromatic two-dimensional maps of the sample by combining parts of the wavelength-coded two-dimensional maps of the sample which correspond to a specific wavelength;
g) building a spectral cube comprising the plurality of monochromatic two-dimensional maps;
h) identifying sample structures on the spectral cube and obtaining their spectral signature;

i) comparing the spectral signatures obtained with a database of spectral signatures of known structures, and/or decomposing the spectral signatures and obtaining an estimation of the abundance of each marker of the sample in each of the identified sample structures.

According to the method of the invention, a sample placed in the observation region is irradiated with radiation emitted by one or several radiation sources. The components of the sample may selectively absorb radiation of certain wavelengths and emit radiation usually at a different wavelength. Often, the internal components of a sample may lack enough contrast to be directly studied and, in such case, class-specific tags may be added to the sample in order to provide contrast and allow the detection of specific components. These components may be DNA, proteins, lipids, carbohydrates, or others, and multiple tags may be used to study multiple components simultaneously. Some of the tags may selectively absorb radiation of certain wavelengths and, when irradiated with a broadband radiation source, emit radiation of wavelength complementary to the radiation absorbed (chromogenic tags). Other tags, when irradiated with high energy radiation of specific wavelengths may emit radiation in a spectrum of wavelengths higher than those absorbed (fluorescent tags). Fluorescent or chromogenic tags may be fluorochromes or chromogens with natural affinity for specific molecules or may be a combination of affinity molecules (e.g. antibodies, DNA reporters, or other affinity molecules known in the literature) and reporter molecules (e.g. chromogens or fluorochromes).

The radiation emitted by the sample is collected by the collection element. After being collected by the collection element and before reaching the image sensor, the emitted radiation is directed through the multichannel filtration element. Displacing the filtration element, a plurality of wavelength-coded two-dimensional maps of the sample is sequentially recorded, wherein each position of the filtration element selectively filters the wavelength of the radiation that reaches each radiation detecting element (or group of radiation elements) of the image sensor. Thus, for each position of the filtration element a wavelength-coded two-dimensional map is generated by the image sensor based on the radiation it receives. In an embodiment, the filtration element is moved parallel to one of the spatial dimensions of the FOV of the collection element, the number of steps needed for the complete displacement of the filtration element through the full FOV defining the number of wavelength-coded two-dimensional maps taken.

From the plurality of wavelength-coded two-dimensional maps, a plurality of monochromatic two-dimensional maps of the sample is built. In an embodiment, the monochromatic two-dimensional maps of the sample is built by combining parts of the wavelength-coded two-dimensional maps which correspond to a specific wavelength. Thus, a plurality of monochromatic two-dimensional maps of the sample is obtained, wherein each one of these monochromatic two-dimensional maps has information of radiation emitted at a given wavelength when the sample is irradiated with a given radiation source. The set of different monochromatic two-dimensional maps obtained compose a spectral cube.

The images obtained with the image sensor are formed by a plurality of pixels, each pixel corresponding to the output of a radiation detecting element. For each pixel the method provides a discontinuous emission spectrum, wherein the point of the spectrum corresponding to a specific wavelength is found in the monochromatic two-dimensional map associated to said wavelength.

Each discontinuous emission spectrum is usually formed by several overlapping pure emission spectra, wherein each pure emission spectrum corresponds to a specific marker. The amount of overlap or mixing of the pure emission spectra depends on the spatial distribution of the markers in the sample.

After the spectral cube has been obtained, the sample structures present in the sample are identified based on the spectral and spatial information obtained and a specific spectral signature is obtained for each identified structure. As a result, a "list mode" file is obtained where the information on the spectral signature and spatial localization is stored for every structure identified.

Finally, the spectral signature of each structure is compared to a set of known spectral signatures and/or is decomposed (unmixed) and an estimation of the abundance of each marker is obtained for that structure.

That is, in this embodiment the monochromatic two-dimensional maps are generated by combining parts of the wavelength-coded two-dimensional maps which correspond to a specific wavelength. In an alternative embodiment of step f) of the method, the monochromatic two-dimensional maps are generated by employing a multivariate interpolation process to obtain for each pixel an estimation of the radiation received at such specific wavelength (λ) based on the recordings from the wavelength-coded two-dimensional maps.

This multivariate interpolation calculation may be performed by several methods well known in the literature such as polynomial interpolation, nearest-neighbor interpolation, kriging, inverse distance weighting, natural neighbor interpolation, radial basis function interpolation, trilinear interpolation, tricubic interpolation, spline interpolation, among others.

In a preferred embodiment, the multivariate interpolation process is a tricubic spline interpolation method.

In a particular embodiment, step h) identifies structures in the spectral cube using spatial segmentation, also denoted spatial clustering, and obtains their specific spectral signature by:
  determining the number of pixels corresponding to the sample structure,
  identifying an area considered to be representative of background,
  determining the area in the background, and
  determining a background corrected signal for each wavelength of the spectrum as:

$$S'_{st} = \sum_{i=1}^{N_{st}} S_{st_i} - N_{st} \frac{\sum_{j=1}^{N_{bck}} S_{bck_j}}{N_{bck}}$$

where $N_{st}$ and $N_{bck}$ is the number of pixels in the selected sample structure and background, respectively; $S_{st_i}$ is the signal measured at pixel i of the sample structure; $S_{bck_j}$ is the signal measured at pixel j of the background; and $S'_{st}$ is the background corrected signal of the sample structure.

Advantageously, background correction allows revealing subtle changes in signal intensity.

In an embodiment, step h) comprises obtaining the size and/or shape of the sample structures.

In a particular embodiment, step h) identifies structures in the spectral cube using spatial segmentation, also denoted spatial clustering, and obtains their size by:

determining the number of pixels corresponding to the sample structure, and
determining the size of the structure as:

$$S = \sum_{i=1}^{N_{st}} \frac{P}{M}$$

where $N_{st}$ is the number of pixels in the selected sample structure; P is the size of the pixel and M is the total optical magnification of the system.

The purpose of step i) is to obtain information on the biological nature of the structures identified in a spectral cube. This may be achieved by comparing the spectral signature of each structure to a set of spectral signatures of known biological structures. Additionally or alternatively, the spectral signature of a structure may be decomposed and the relative contribution of each of the markers under study obtained; the relative contribution of multiple markers may help to identify the nature of said structures based on the knowledge of an expert in the field or based on a reference database of proportions previously built by experts.

The determination of the relative contribution from each marker of the sample to each structure of the spectral cube in step i) is performed using any of the spectral unmixing methods known in the literature. In a preferred embodiment, a Linear Mixing Model for a mixture of emissions is assumed and different methods, like ordinary least-square (OLS), weighted least squares (WLS), generalized linear model (GLM), non-negative least-squares (NNLS), among other, may be employed to solve the LMM problem. As a result of this unmixing process, a plurality of images is obtained for each marker of the sample. These monochromatic images will be denoted "marker images" herein and represent the abundance of each marker in the sample.

In an embodiment, steps b) to f) are performed for a plurality of irradiation wavelengths ($\Lambda$) and/or a plurality of irradiation modes ($\alpha$). In this embodiment, in step f) each monochromatic two-dimensional map corresponds to radiation emitted at a specific wavelength ($\lambda$) when the sample is irradiated with a given irradiation wavelength ($\Lambda$) using a given irradiation mode ($\alpha$), and step g) is performed by combining the plurality of monochromatic two-dimensional maps. The plurality of irradiation wavelengths and/or irradiation modes may be provided using one radiation source with tunable wavelength and/or selectable position or with a plurality of radiation sources.

In addition, in a particular embodiment, the spectral cube is built sorting the plurality of monochromatic two-dimensional maps according to both the specific wavelength ($\lambda$) and given irradiation wavelength ($\Lambda$).

In an embodiment the solid-phase sample is a biological sample, such as a sample of human, animal, fungal or botanical origin.

In an embodiment the solid-phase sample is a biopsy of human tissue.

In an embodiment the method comprises the step of staining the sample with at least one molecular tag.

In an embodiment, during the staining step, at least one molecular tag is chromogenic or fluorescent.

In an embodiment during the staining step, at least one tag is a combination of an affinity molecule, which presents a natural affinity for at least one component of the sample, and a reporter molecule, which is a chromogen or a fluorochrome.

In an embodiment at least one of the affinity molecules combined with a reporter molecule is an antibody.

In an embodiment during the staining step, at least one tag is a single molecule which has a natural affinity for at least one component of the sample and is, simultaneously, a chromogen or a fluorochrome.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 1-A to 1-E schematically show five embodiments of the hyperspectral quantitative imaging cytometry system according to the invention.

DETAILED DESCRIPTION OF THE PREFERRED EMBODIMENT

Figure 2:
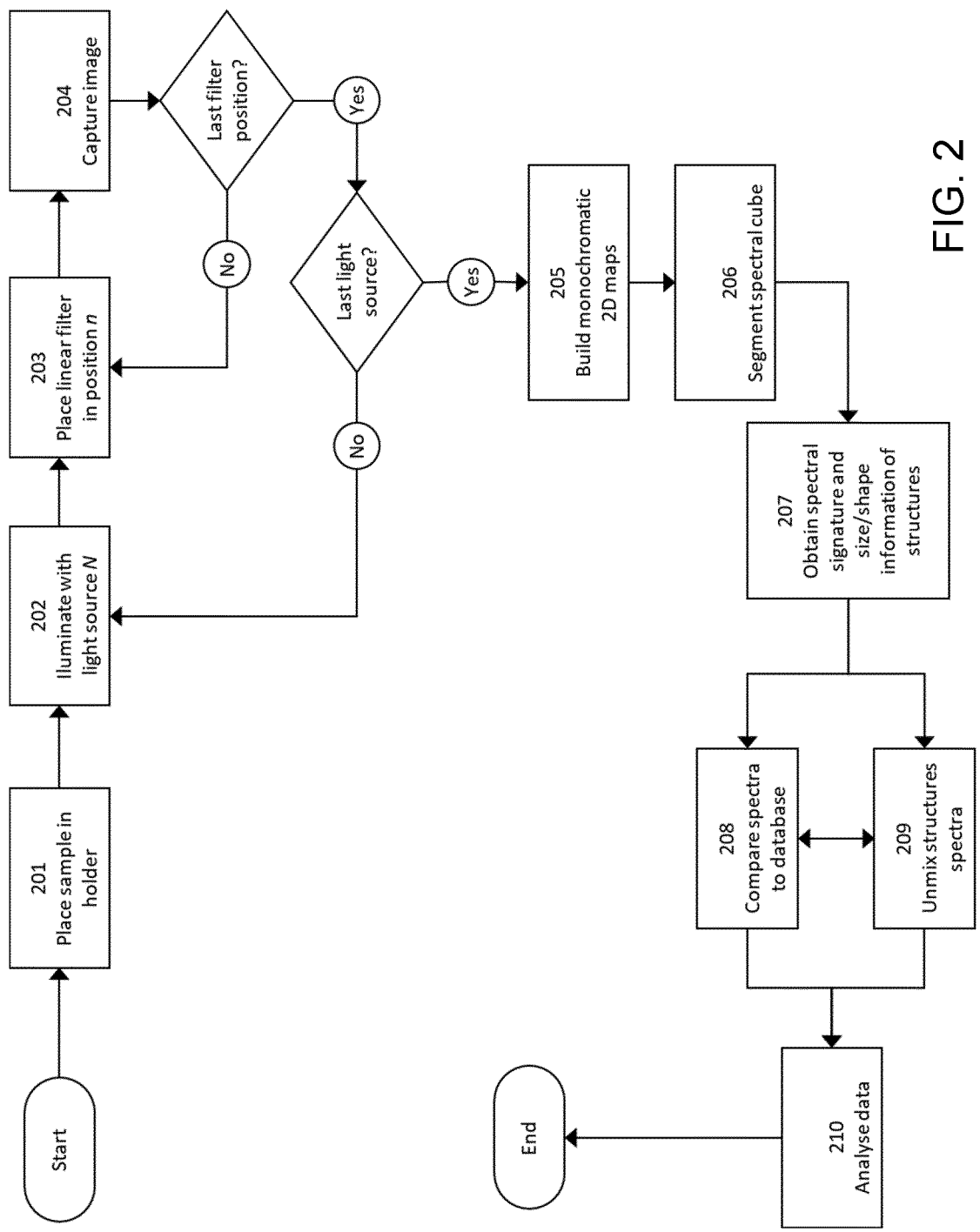
FIG. 2 shows a flow chart of a method according to an embodiment of the invention.

A hyperspectral quantitative imaging cytometry system (100) according to the invention is schematically shown in FIGS. 1-A to 1-E.

The system (100) comprises an observation region (104), comprising a sample holder (112) configured to hold one or more solid-phase samples. In an embodiment the sample holder is configured to retain at least one solid phase sample support, each support being adapted to contain an immobilized sample, preferably a biological sample. These solid phase sample supports may be of different materials, preferably crystalline and transparent to light (e.g. glass or plastic), and may have different shapes and sizes, such as rectangular shape (e.g. a microscope slide).

The biological samples may be of human, animal, fungal or plant origin and may be used alone or in combination with a molecular tag.

Preferably, a molecular tag is used to reveal the components of the biological sample. The reporter part of the molecular tag may luminesce or selectively absorb radiation when irradiated. The molecular tag may exhibit a characteristic radiation spectrum because of its physical structure or when combined with a biological sample.

The system (100) comprises one or several radiation sources (101, 102, 103) to irradiate and stimulate the markers of a sample placed in the observation region (104). From this interaction, radiation may be emitted by the sample as a result of any process such as scattering, fluorescence, phosphorescence, chemiluminescence or selective absorption/transmittance.

In an embodiment, the biological sample to be placed in the observation region (104) is a biological tissue, i.e. a collection of interconnected cells and their extracellular matrix that perform a similar function within an organism. The components of that biological tissue may naturally absorb light of certain wavelengths and emit radiation usually at a different wavelength. If the components of a biological tissue lack enough contrast to be directly studied, class-specific tags may be added to the sample in order to provide contrast and allow the detection of specific components. These components may be DNA, proteins, lipids, carbohydrates, or others, and multiple tags may be used to study multiple components simultaneously.

In response to the radiation, the components of the sample and/or the molecular tags used in combination with the sample emit a spectrum of radiation which is captured by a collection element (105). The collected radiation is directed to a multichannel filtration element (108) and redirected to an image sensor (109).

The embodiment shown in FIG. 1-A includes three radiation sources (101, 102, 103) which emit light in the visible spectrum. However, a different number of radiation sources may be used. Also, any known radiation source suitable for excitation of the target sample material may be used. For example, the radiation sources (101, 102, 103) may be lasers, light emitting diodes ("LEDs") and/or lamps. The lasers or LEDs may be configured to emit a multiple number of excitation wavelengths or a single wavelength. If the radiation source (101) produces more than one wavelength of radiation, a band-pass filter (107) may be placed in front of the radiation source (101) in order to filter out any unwanted wavelength before the radiation reaches the sample in the observation region (104).

In the embodiment of FIG. 1-A each radiation source (101, 102, 103) irradiates the totality of the observation region (104) at once (i.e. wide field irradiation).

In the embodiment shown in FIG. 1-B, there is only one radiation source (101) which irradiates the observation region (104) with beams of light (106) coming from the same side where the collection element (105) is placed and directed along the optical axis of the collection element (105) (bright field epi-illumination). In another embodiment shown in FIG. 1-C, a radiation source (102) irradiates the observation region (104) with beams of light (106) coming from the same side where the collection element (105) is placed and directed at a non-zero angle with respect to the optical axis of the collection element (105) (dark field epi-illumination). In another embodiment shown in FIG. 1-D, a radiation source (103) irradiates the observation region (104) with beams of light (106) coming from the side of the observation region opposite to the side where the collection element (105) is placed and directed along the optical axis of the collection element (105) (bright field trans-illumination). In another embodiment shown in FIG. 1-E, a radiation source (103) irradiates the observation region (104) with beams of light (106) coming from the side of the observation region opposite to the side where the collection element (105) is placed and directed at a non-zero angle with respect to the optical axis of the collection element (105) (dark field trans-illumination).

Thus, in the embodiments of FIGS. 1-B and 1-C the radiation source (101, 102) is arranged on the same side of the observation region (104) as the collection element (105), such that the sample in the observation region (104) reflects the radiation of the radiation source (101, 102) before being collected by the collection element (105). In the embodiments of FIGS. 1-D and 1-E the observation region (104) is interposed between the radiation source (103) and the collection element (105), such that the radiation from the radiation source (103) passes through the sample in the observation region (104) before being collected by the collection element (105).

In a preferred embodiment as the one shown in FIG. 1-A, two or more of the above imaging geometries shown in FIGS. 1-B to 1-E may co-exist in the system and may be used sequentially to obtain complementary data.

The radiation emitted by the irradiated sample is collected by the collection element (105). In a preferred embodiment the collection element is configured to capture radiation from multiple spatial locations of the observation region (104) simultaneously. In an embodiment the collection element is a lens or a combination of lenses.

In a preferred embodiment the collection element has a low magnification factor (M) in order to achieve a large field of view (FOV) and obtain information on a larger two-dimensional area of the observation region (104) and, consequently, of the sample. Preferably, the magnification factor value (M) is lower than 20, more preferably lower than 10, most preferably lower than 2. The total magnification factor of the collection element (105) combined with any other element of the system with a magnification factor may be selected to guarantee a correct sampling frequency of the FOV by the image sensor (109). The sampling frequency of the FOV may be selected to distinguish individual cells in a biological tissue sample, but not to distinguish small sub-cellular details. The image sensor (109) comprises a two-dimensional array of radiation detecting elements. The final magnification factor of the system may depend on the characteristics of the image sensor, such as the size of the radiation detecting elements.

After being collected by the collection element (105) and before reaching the image sensor (109), the radiation is directed through a multichannel filtration element (108). The multichannel filtration element (108) selectively filters the radiation that reaches each radiation detecting element, or a group of radiation detecting elements, of the image sensor (109). In an embodiment the multichannel filtration element (108) is a continuous or semi-continuous variable bandpass filter.

In this embodiment the multichannel filtration element is arranged to be displaceable in one or two spatial dimensions (x, y), thus allowing the image sensor (109) to generate a plurality of two-dimensional outputs, each output representing a different wavelength-coded ($\lambda=\lambda(y)$) two-dimensional (x, y) map of the sample. Each wavelength-coded two-dimensional map of the sample generated by the image sensor (109) may be sent to a processor (110) and/or stored in a memory (111) for further processing.

The image sensor (109) is a two-dimensional array sensor, where each radiation detecting element in the array receives radiation coming from a different two-dimensional spatial location in the sample, generating an image that is a spatial (x, y) map of the sample under study. The image sensor (109) may be a two-dimensional photodetector array sensor, such as a charge-coupled device (CCD), a complementary metal oxide semiconductor (CMOS), an electron multiplier CCD (EMCCD) or any other similar system to obtain two-dimensional spatial data. The two-dimensional image sensor may be triggered to sample data cumulatively during a specified amount of time.

FIG. 2 shows a flow chart of a method according to an embodiment of the invention. A sample, which may have been stained with a tag, is placed (201) in the observation region (104). A first radiation source (101, 102, 103) is activated (202), the filtration element (108) is located (203) in its initial position and the image sensor (109) records (204) a first image representing the first wavelength-coded two-dimensional map of the biological sample. The filtration element (108) is then moved (203) to a second position and a second wavelength-coded two-dimensional map is obtained. This process is continued until the last position of the filtration element (108) is reached. If more than one irradiation modes (α) or irradiation wavelengths (Λ) are used, a second radiation source (101, 102, 103) is activated (202), the filtration element (108) is moved (203) to its initial position and a new image is taken, corresponding to a new wavelength-coded two-dimensional map. This process is continued until the last position of the filtration element (108) is reached and repeated for all the radiation sources.

A processor (110) takes the plurality of wavelength-coded two-dimensional maps (301) of the biological sample and builds (205) a plurality of monochromatic two-dimensional maps (304) of the sample by combining parts of the wavelength-coded two-dimensional maps (301) which correspond to a specific wavelength. Each one of these monochromatic two-dimensional maps has spatially related (x, y) information on the radiation emitted at a given wavelength (λ) when the sample is irradiated with a given radiation wavelength (Λ) using a given irradiation mode (α). The combination of these plurality of monochromatic two-dimensional maps (304) constitutes a five-dimensional (x, y, λ, Λ, α) dataset (305) which may be simplified into a spectral cube (306) with two spatial dimensions (x, y) and one spectral dimension (α, Λ, λ).

Although in this exemplary embodiment, the monochromatic two-dimensional maps are generated by combining parts of the wavelength-coded two-dimensional maps which correspond to a specific wavelength, in an alternative embodiment, the monochromatic two-dimensional maps are generated by employing a multivariate interpolation process to obtain for each pixel an estimation of the radiation received at such specific wavelength (λ) based on the recordings from the wavelength-coded two-dimensional maps.

The processor (110) takes a spectral cube (306) generated from a biological sample and performs a spatial segmentation (206) of data locations in order to identify meaningful biological sample structures (e.g. cells) and obtain the spectral signature (207) of each of those structures. Then, the processor (110) compares (208) the spectral signature of each structure to a database of spectra of known structures stored in a memory (111). Either alternatively or concurrently with step 208, the processor (110) performs an estimation (209) of the abundance of each marker (i.e. spectral unmixing) in each of those identified sample structures by determining the relative contribution from each marker to the spectral signature of each structure identified in the spectral cube. The information obtained on the nature of the structures identified and/or on the abundance of each marker, may be correlated (210) by an expert in the field with other relevant information on the sample.

A generally accepted model for a mixture of emissions, needed to perform spectral unmixing, is a Linear Mixing Model (LMM) which assumes a linear combination of the abundance of the emissions. The plurality of monochromatic two-dimensional maps provides a discontinuous emission spectrum for each pixel, wherein the point of the spectrum corresponding to a specific wavelength is found in the monochromatic two-dimensional map corresponding to said wavelength.

According to LMM, it is assumed that the discontinuous emission spectrum is a linear combination of the spectra of individual markers. The emissions of M excited markers coming from N pixels or structures are taken at L excitation wavelengths (Λ) and generate L individual signals (channels). Each pixel or structure is therefore represented by a vector of L channels that contains the sum of contributions of M markers per channel. The LMM can be written in its matrix form as:

$$Y = AH$$

where Y is the L×N matrix of detected intensities, A is the L×M matrix of mixing that contains the expected emission of each of the M markers in each of the L spectral channels and H is the M×N matrix of real markers concentrations for each structure.

The uncertainty in the measurement may also be considered by including noise into the model. Usually, two noise models are adopted: the first model is an additive gaussian noise (white noise) model, in which the above equation is modified into:

$$Y = AH + R$$

where R is a matrix formed by independently identically distributed gaussian variables with zero mean. The second model uses a Poisson process to model the photon emission.

Different methods, like ordinary least-square (OLS), weighted least squares (WLS), generalized linear model (GLM), non-negative least-squares (NNLS), among other, may be employed to solve the LMM problem and obtain spatial maps with the abundance of each marker, which may be sent to a processor and/or stored in a memory for further processing.

Figure 3:
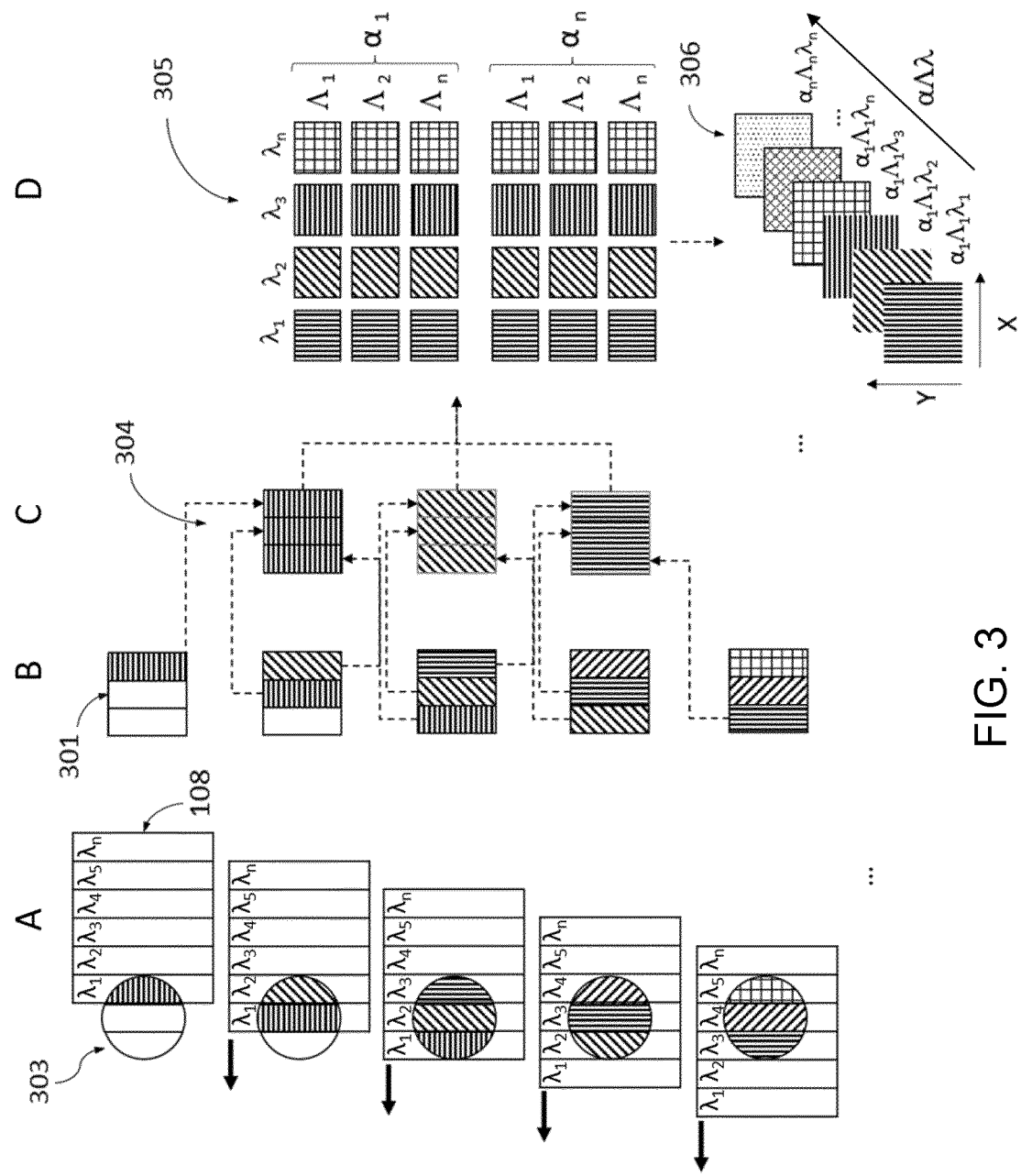
FIG. 3 schematically shows the process of obtaining wavelength-coded spatial maps of the sample.

FIG. 3 represents an embodiment of the steps of obtaining wavelength-coded two-dimensional maps of the biological sample (A) and their transformation into monochromatic two-dimensional maps of the biological sample (B & C) which, when combined, constitute a spectral cube of the sample (D). The process uses all the consecutive images taken with the different positions of the filtration element (108) for a given irradiation wavelength (Λ) and a given irradiation mode (α) and, then, works in a (x, y, λ) dimensional space. If more than one irradiation wavelength (Λ) and/or more than one irradiation mode (α) has been used, the process is done for each set of images independently, wherein each set of images correspond to a given irradiation wavelength (Λ) and a given irradiation mode (α).

Each wavelength-coded two-dimensional map (301) is obtained by moving the filtration element (108) parallel to one of the spatial dimensions (y) of the FOV of the collection element in several consecutive discrete steps (A). The number of steps needed for the complete displacement of the filtration element through the full FOV (303) defines the number of images taken and thus the number of wavelength-coded two-dimensional maps.

Each wavelength-coded two-dimensional map (301) is divided (sliced) into "n" bands along the "y" spatial dimension (B). The number of bands "n" corresponds to the number of steps needed for the complete displacement of one band of the filter through the full FOV. Each one of the bands is combined with the bands from the other wavelength-coded two-dimensional maps (301) that correspond to the same wavelengths to recreate monochromatic two-dimensional maps (304) of the biological sample, each one corresponding to a specific wavelength. The complete set of monochromatic two-dimensional maps (304) constitute a spectral cube (306). In FIG. 3 the bands corresponding to the same wavelength are represented with the same pattern.

In an alternative embodiment, the monochromatic two-dimensional maps are generated from the wavelength-coded two-dimensional maps by employing a multivariate interpolation process to obtain for each pixel an estimation of the radiation received at specific wavelengths ($\lambda$) based on the recordings from the wavelength-coded two-dimensional maps.

The following clauses are herein provided according to the invention:

Clause 1. A hyperspectral quantitative imaging cytometry system (100), comprising:
- an observation region (104), comprising a sample holder configured to hold one or more solid-phase samples,
- at least one radiation source (101, 102, 103) configured to irradiate the observation region (104),
- a collection element (105) configured to collect the radiation emitted through or reflected by the sample upon irradiation by the at least one radiation source (101, 102, 103),
- a multichannel filtration element (108) configured to selectively filter the wavelength of the radiation collected by the collection element (105), and
- an image sensor (109) configured to receive the filtered radiation and to generate an image that is a two-dimensional map of the sample, the image sensor (109) comprising a two-dimensional array of radiation detecting elements.

Clause 2. Hyperspectral quantitative imaging cytometry system (100) according to the previous clause, wherein the filtration element (108) is arranged to be movable between at least two positions, wherein each position of the filtration element (108) selectively filters the wavelength of the radiation that reaches each radiation detecting element of the image sensor (109).

Clause 3. Hyperspectral quantitative imaging cytometry system (100) according to clause 2, wherein the system further comprises a processor (110), the processor (110) being configured to:
- receive a plurality of wavelength-coded two-dimensional maps (301) of the sample, the plurality of wavelength-coded two-dimensional maps (301) being associated to a plurality of positions of the filtration element (108), wherein a wavelength-coded two-dimensional map is an image generated by the image sensor (109) based on the radiation it receives for a position of the filtration element (108);
- generate (205) a plurality of monochromatic two-dimensional maps (304) of the sample by combining parts of the wavelength-coded two-dimensional maps (301) of the sample which correspond to a specific wavelength ($\lambda$);
- build a spectral cube (306) comprising the plurality of monochromatic two-dimensional maps (304);
- identify sample structures (206) on the spectral cube (306) and obtain their spectral signature (207);
- compare (208) the obtained spectral signatures with a database of spectral signatures of known structures and/or decompose the spectral signatures and obtain (209) an estimation of the abundance of each marker in each of the identified sample structures.

Clause 4. Hyperspectral quantitative imaging cytometry system (100) according to any of the previous clauses, wherein the observation region (104) is interposed between at least one radiation source (103) and the collection element (105), such that the radiation of said radiation source (103) passes through the observation region (104) before being collected by the collection element (105), according to a trans-illumination configuration.

Clause 5. Hyperspectral quantitative imaging cytometry system (100) according to any of the previous clauses, wherein at least one radiation source (102), the observation region (104) and the collection element (105) are arranged according to a dark field configuration.

Clause 6. Hyperspectral quantitative imaging cytometry system (100) according to any of the previous clauses, wherein at least one radiation source (101, 103), the observation region (104) and the collection element (105) are arranged according to a bright field configuration.

Clause 7. Hyperspectral quantitative imaging cytometry system (100) according to any of the previous clauses, wherein at least one radiation source (101, 102) is oriented towards the observation region (104), such that the observation region (104) reflects the radiation of said radiation source (101, 102) before being collected by the collection element (105), according to an epi-illumination configuration.

Clause 8. Hyperspectral quantitative imaging cytometry system (100) according to any of the previous clauses, wherein the system (100) further comprises a memory (111).

Clause 9. Hyperspectral quantitative imaging cytometry system (100) according to any of the previous clauses, wherein the system (100) further comprises at least one band-pass filter (107) interposed between at least one radiation source (101, 102, 103) and the observation region (104).

Clause 10. Hyperspectral quantitative imaging cytometry system (100) according to any of the previous clauses, wherein at least one radiation source (101, 102, 103) is a laser, a light emitting diode or a lamp.

Clause 11. Hyperspectral quantitative imaging cytometry system (100) according to any of the previous clauses, wherein the collection element (105) comprises a lens, or a combination of lenses, configured to capture radiation from multiple spatial locations of the observation region simultaneously.

Clause 12. Hyperspectral quantitative imaging cytometry system (100) according to any of the previous clauses,
- wherein the collection element (105) has a magnification factor value (M) lower than 20, preferably lower than 10, most preferably lower than 2; and/or
- wherein the collection element (105) has a numerical aperture value higher than 0.25, preferably equal to or higher than 0.5.

Clause 13. Hyperspectral quantitative imaging cytometry system (100) according to any of the previous clauses, wherein the filtration element (108) is a continuous or a semi-continuous linear variable filter between 200 nm and 1200 nm, preferably between 350 nm and 950 nm.

Clause 14. Method for obtaining data from a solid-phase sample using a hyperspectral quantitative imaging cytometry system (100) according to any of the previous claims, comprising the following steps:
a) providing a sample (201);
b) irradiating the sample (202) with radiation that interacts with the sample, such that the sample emits radiation;
c) capturing the emitted radiation with the collection element (105);
d) filtering the emitted radiation using the multichannel filtration element (108);
e) sequentially recording (204) a plurality of wavelength-coded two-dimensional maps (301) of the sample coordinating with the sequential displacement (203) of the filtration element (108), wherein each position of the filtration element (108) selectively filters the wavelength (λ) of the radiation that reaches each radiation detecting element of the image sensor (109) and wherein a wavelength-coded two-dimensional map is generated by the image sensor (109) based on the radiation it receives for each position of the filtration element (108);

f) generating (205) a plurality of monochromatic two-dimensional maps (304) of the sample by combining parts of the wavelength-coded two-dimensional maps (301) of the sample which correspond to a specific wavelength (λ) of emitted radiation;

g) building a spectral cube (306) comprising the plurality of monochromatic two-dimensional maps (304);

h) identifying sample structures (206) on the spectral cube (306) and obtaining their spectral signature (207);

i) comparing (208) the spectral signatures obtained with a database of spectral signatures of known structures and/or decomposing the spectral signatures and obtaining (209) an estimation of the abundance of each marker in each of the identified sample structures.

Clause 15. Method according to clause 14, wherein steps b) to f) are performed for a plurality of irradiation wavelengths (Λ) and/or a plurality of irradiation modes (α), wherein in step f) each monochromatic two-dimensional map (304) corresponds to radiation emitted at a specific wavelength (λ) when the sample is irradiated with a given irradiation wavelength (Λ) and in a given irradiation mode (α), and wherein step g) is performed by combining the plurality of monochromatic two-dimensional maps (304).

What is claimed is:

1. A hyperspectral quantitative imaging cytometry system, comprising:
    an observation region, comprising a sample holder configured to hold one or more solid-phase samples,
    at least one radiation source configured to irradiate the observation region,
    a collector configured to collect the radiation emitted through or reflected by the sample upon irradiation by the at least one radiation source, wherein the collector has a magnification factor value (M) equal to or lower than 20, and has a numerical aperture value equal to or higher than 0.25,
    a multichannel filter configured to selectively filter the wavelength of the radiation collected by the collector, and
    an image sensor configured to receive the filtered radiation and to generate an image that is a two-dimensional map of the sample, the image sensor comprising a two-dimensional array of radiation detectors,
    wherein the system comprises a first lens and a second lens, wherein the first lens is configured to capture the image, and the second lens is configured to capture an intermediate image formed between the collector and the image sensor and project the intermediate image to the image sensor,
    wherein the collector comprises a lens configured to capture multiple radiations from multiple spatial locations of the observation region simultaneously.

2. The hyperspectral quantitative imaging cytometry system according to claim 1, wherein the filter is arranged to be movable between at least two positions, wherein each position of the filter selectively filters the wavelength of the radiation that reaches each radiation detector of the image sensor.

3. The hyperspectral quantitative imaging cytometry system according to claim 2, wherein the system further comprises a processor, the processor being configured to:
    receive a plurality of wavelength-coded two-dimensional maps of the sample, the plurality of wavelength-coded two-dimensional maps being associated to a plurality of positions of the filter, wherein a wavelength-coded two-dimensional map is an image generated by the image sensor based on the radiation it receives for a position of the filter;
    generate a plurality of monochromatic two-dimensional maps of the sample by combining parts of the wavelength-coded two-dimensional maps of the sample which correspond to a specific wavelength (λ);
    build a spectral cube comprising the plurality of monochromatic two-dimensional maps;
    identify sample structures on the spectral cube and obtain their spectral signature;
    compare the obtained spectral signatures with a database of spectral signatures of known structures and/or decompose the spectral signatures and obtain an estimation of the abundance of each marker in each of the identified sample structures, a marker being any component on the sample that emits radiation either naturally or due to the presence of molecular tags added to the sample.

4. The hyperspectral quantitative imaging cytometry system according to claim 2, wherein the system further comprises a processor, the processor being configured to:
    receive a plurality of wavelength-coded two-dimensional maps of the sample, the plurality of wavelength-coded two-dimensional maps being associated to a plurality of positions of the filter, wherein a wavelength-coded two-dimensional map is an image generated by the image sensor based on the radiation it receives for a position of the filter;
    generate a plurality of monochromatic two-dimensional maps of the sample which correspond to a specific wavelength (λ) by employing a multivariate interpolation process to obtain for each pixel an estimation of the radiation received at such specific wavelength (λ) based on the recordings from the wavelength-coded two-dimensional maps;
    build a spectral cube comprising the plurality of monochromatic two-dimensional maps;
    identify sample structures on the spectral cube and obtain their spectral signature;
    compare the obtained spectral signatures with a database of spectral signatures of known structures and/or decompose the spectral signatures and obtain an estimation of the abundance of each marker in each of the identified sample structures, a marker being any component on the sample that emits radiation either naturally or due to the presence of molecular tags added to the sample.

5. The hyperspectral quantitative imaging cytometry system according to claim 1, wherein the observation region is interposed between at least one radiation source and the collector, such that the radiation of said radiation source passes through the observation region before being collected by the collector, according to a trans-illumination configuration.

6. The hyperspectral quantitative imaging cytometry system according to claim 1, wherein at least one radiation source, the observation region and the collector are arranged according to a dark field configuration.

7. The hyperspectral quantitative imaging cytometry system according to claim 1, wherein at least one radiation source, the observation region and the collector are arranged according to a bright field configuration.

8. The hyperspectral quantitative imaging cytometry system according to claim 1, wherein at least one radiation source is oriented towards the observation region, such that the observation region reflects the radiation of said radiation source before being collected by the collector, according to an epi-illumination configuration.

9. The hyperspectral quantitative imaging cytometry system according to claim 1, wherein the system further comprises a memory.

10. The hyperspectral quantitative imaging cytometry system according to claim 1, wherein the system further comprises at least one band-pass filter interposed between at least one radiation source and the observation region.

11. The hyperspectral quantitative imaging cytometry system according to claim 1, wherein at least one radiation source is a laser, a light emitting diode or a lamp.

12. The hyperspectral quantitative imaging cytometry system according to claim 1, wherein the collector comprises a lens, or a combination of lenses, configured to capture radiation from multiple spatial locations of the observation region simultaneously.

13. The hyperspectral quantitative imaging cytometry system according to claim 1,
wherein the collector has a magnification factor value (M) equal to or lower than 10; and/or
wherein the collector has a numerical aperture value equal to or higher than 0.5.

14. The hyperspectral quantitative imaging cytometry system according to claim 1, wherein the filter is a continuous or a semi-continuous linear variable filter.

15. A method for obtaining data from a solid-phase sample using a hyperspectral quantitative imaging cytometry system according to claim 1, comprising:
a) providing a solid-phase sample;
b) irradiating the sample with radiation that interacts with the sample, such that the sample emits radiation;
c) capturing the emitted radiation with the collector;
d) filtering the emitted radiation using the multichannel filter;
e) sequentially recording a plurality of wavelength-coded two-dimensional maps of the sample coordinating with the sequential displacement of the filter, wherein each position of the filter selectively filters the wavelength ($\lambda$) of the radiation that reaches each radiation detector of the image sensor and wherein a wavelength-coded two-dimensional map is generated by the image sensor based on the radiation it receives for each position of the filter;
f) generating a plurality of monochromatic two-dimensional maps of the sample based on the wavelength-coded two-dimensional maps of the sample;
g) building a spectral cube comprising the plurality of monochromatic two-dimensional maps;
h) identifying sample structures on the spectral cube and obtaining their spectral signature;
i) comparing the spectral signatures obtained with a database of spectral signatures of known structures and/or decomposing the spectral signatures and obtaining an estimation of the abundance of each marker in each of the identified sample structures, a marker being any component on the sample that emits radiation either naturally or due to the presence of molecular tags added to the sample.

16. The method according to claim 15, wherein said b) to f) are performed for a plurality of irradiation wavelengths ($\Lambda$) and/or a plurality of irradiation modes ($\alpha$), wherein in said f) each monochromatic two-dimensional map corresponds to radiation emitted at a specific wavelength ($\lambda$) when the sample is irradiated with a given irradiation wavelength ($\Lambda$) and in a given irradiation mode ($\alpha$), and wherein said g) is performed by combining the plurality of monochromatic two-dimensional maps.

17. The method according to claim 15, where the monochromatic two-dimensional maps are generated by combining parts of the wavelength-coded two-dimensional maps which correspond to a specific wavelength.

18. The method according to claim 15, where the monochromatic two-dimensional maps are generated by employing a multivariate interpolation process to obtain for each pixel an estimation of the radiation received at such specific wavelength ($\lambda$) based on the recordings from the wavelength-coded two-dimensional maps.

19. The method according to claim 18, wherein the multivariate interpolation process is a tricubic spline interpolation method.

20. The method according to claim 15, wherein in said a) class-specific tags have been added to the solid-phase sample in order to provide contrast and allow the detection of specific components.

21. The hyperspectral quantitative imaging cytometry system according to claim 1, wherein the collector has a magnification factor value (M) equal to or lower than 2; and/or wherein the collector has a numerical aperture value equal to or higher than 0.5.

22. The hyperspectral quantitative imaging cytometry system according to claim 1, wherein the filter is a continuous or a semi-continuous linear variable filter between 200 nm and 1200 nm.

23. The hyperspectral quantitative imaging cytometry system according to claim 1, wherein the filter is a continuous or a semi-continuous linear variable filter between 350 nm and 950 nm.

* * * * *